United States Patent [19]
Yoshida

[11] Patent Number: 5,960,192
[45] Date of Patent: Sep. 28, 1999

[54] PORTABLE TERMINAL WHICH RELIABLY CONFIRMS PROGRAM INSTALLATION

[75] Inventor: Kenichi Yoshida, Tokyo, Japan

[73] Assignee: NEC Corporation, Japan

[21] Appl. No.: 08/890,101

[22] Filed: Jul. 9, 1997

[30] Foreign Application Priority Data

Jul. 12, 1996 [JP] Japan ................................. 8-182987

[51] Int. Cl.⁶ .................................................. G06F 1/14
[52] U.S. Cl. ...................... 395/557; 395/750.01; 395/712
[58] Field of Search .................... 395/712, 651, 395/652, 653, 750.01, 750.07, 750.08, 557, 559

[56] References Cited

U.S. PATENT DOCUMENTS

| | | | |
|---|---|---|---|
| 5,560,022 | 9/1996 | Dunstan et al. | 395/750 |
| 5,596,711 | 1/1997 | Burckhartt et al. | 395/182.21 |
| 5,692,197 | 11/1997 | Narad et al. | 395/750 |

FOREIGN PATENT DOCUMENTS

| | | |
|---|---|---|
| 61-86877 | 5/1986 | Japan . |
| 5-241796 | 9/1993 | Japan . |

*Primary Examiner*—Dennis M. Butler
*Attorney, Agent, or Firm*—Ostrolenk, Faber, Gerb & Soffen, LLP

[57] ABSTRACT

A portable terminal is provvided in which program installation is confirmed reliably for preventing the portable terminal from being left in an abnormal state consuming its battery. The portable terminal of the invention includes a timer (2) for outputting a time-out signal when a predetermined time has passed after the timer is enabled, and control means (1, 3) for enabling the timer when program installation is started in the portable terminal, for disabling the timer when the program installation is accomplished normally, and for turning off a power supply of the portable terminal when the control means receives the time-out signal.

5 Claims, 10 Drawing Sheets

PORTABLE TERMINAL WHICH RELIABLY CONFIRMS PROGRAM INSTALLATION

BACKGROUND OF THE INVENTION

The present invention relates to a portable terminal wherein program installation is confirmed reliably for preventing a malfunction because of a fall of its power supply.

There is a portable terminal wherein an operating system adequate for an application program is installed optionally, selected from operating systems prepared in a host computer, for example, whereof an example is disclosed in a Japanese patent application laid open as a Provisional Publication No. 241796/'93, entitled "An Install Method of a Terminal System". In the prior art, an easy and reliable method is proposed for installing an operating system in a portable terminal.

FIG. 8 is a schematic diagram illustrating the install method of the prior art for installing programs in a portable terminal 35 connected to a host computer 36 by way of an adapter.

In the portable terminal 35, there are provided a ROM (Read Only Memory) 31, a first RAM (Random Access Memory) 32, and a second RAM 33. In a memory device 34 of the host computer 36, there are prepared an initialization program 341 for initializing the second RAM 33 of the portable terminal 35, a copy program 342, an application program 343, and an application start program 344 including an operating system adequate for the application program 343.

A basic operating system 311, a communication program 312 and an install program 313 are prepared in the ROM 31 of the portable terminal 35.

Now, the installation processes of the portable terminal 35 is described.

When the portable terminal 35 is switched on, the basic operating system 311 and the communication program 312 are activated and the install program 313 is executed. The install program 313 deploys the initialization program 341 in the first RAM 32 by way of the communication program 312 (at step ST1) from the host computer 36. The initialization program 341 initializes the second RAM 33 and deploys the copy program 342 in the first RAM 32 (at step ST2) through the communication program 312. The copy program 342 reads out the application program 343 and the application start program 344 through the communication program 312 and stores them in the second RAM 33 (at step ST3). Then, at the end of the installation processes, the portable terminal 35 is reset and the application start program 344 is activated and deploys the application program 343.

Thus, the application program 343 is execited in the portable terminal 35 on the adequate operating system.

In the portable terminal which is driven by a battery, it is important to prevent malfunction due to a fall of power supply voltage, which may result in the destruction of programs or data stored therein.

FIG. 9 is a block diagram illustrating a portable terminal disclosed in a Japanese patent application entitled "Portable Data Terminal" and laid open as a Provisional Publication No. 86877/'86, wherein the activation of the portable terminal is blocked when a fall of power supply is found or it is connected to a discharged battery.

Referring to FIG. 9, the portable terminal comprises a voltage drop detector 45, a control section 46, a start signal controller 47, a start signal generator 48 and a memory 49. When the power supply voltage drops, it is detected by the voltage drop detector 45 and a voltage drop detection signal is delivered both to the control section 46 and the start signal controller 47.

Receiving the voltage drop detection signal, a protection program in the control section 46 controls the portable terminal to alarm the user and to stop the operation, of the portable terminal if in operation at that time.

When the portable terminal is switched on, the start signal generator 48 delivers a start signal to the start signal controller 47. At the same time, the voltage drop detection signal is also delivered to the start signal controller 47 when the power supply voltage is lower than a certain level. In this case, the start signal is suppressed by the start signal controller 47 and not transmitted to the control section 46. Thus, the portable terminal remains disabled. When the power supply voltage is higher than the certain level, the start signal generated by the start signal generator 48 is transmitted to the control section 46 for activating the portable terminal.

FIGS. 10a and 10b are timing charts illustrating the operation of the start signal controller 47. The voltage drop detection signal 101 becomes HIGH when the power supply voltage is lower than the certain level, and the start signal 102 becomes LOW when indicating to the control section 46 to start program installation. The start signal controller 47 outputs OR logic 103 of the voltage drop detection signal 101 and the start signal 102. So, the signal delivered to the control section 46 remains at HIGH level as shown in FIG. 10a, when the voltage drop is detected, while the same logic with the start signal 102 is transmitted when the voltage drop detection signal 101 is at LOW level as shown in FIG. 10b for indicating to the control section 46 to start the program installation.

Thus, malfunction because of a fall of the power supply voltage is prevented in the prior art for protecting the data or programs stored in the portable terminal.

However, there may be cases where the protection program itself does not work normally because of the fall of the power supply voltage in the portable terminals of the prior art.

In such case, the control section 46 can not control the portable terminal to alarm the user or to disable the portable terminal. So, the portable terminal is left in an abnormal state of operation which consumes the power supply, resulting in a malfunction or a destruction of data or programs stored therein.

There may be also a case where the program installation is started but not accomplished normally. Even when the power supply voltage is confirmed to be higher than the certain level at the time the portable terminal is switched on, a power level in a comparatively small battery provided in the portable terminal may in the installation processes where many parts of the portable terminal begin to operate at once consuming a peak power, resulting in a malfunction of the protection program.

Further, in a portable terminal where operating system and programs are installed from a host computer through a cable or a radio network such as beforehand described, there may be cases that the program installation is not accomplished normally because of a communication error. Therefore, especially when the portable terminal is started without user input, by use of a timer, it may be left not started normally while consuming its battery, resulting in the destruction of data or programs therein.

SUMMARY OF THE INVENTION

Therefore, a primary object of the present invention is to provide a portable terminal to be used in connection with a variety of host computers by installing operating systems adequate for the host computers, wherein the installation of the operating systems can be confirmed reliably for preventing the portable terminal from being left in an abnormal state consuming its battery.

In order to achieve the object, a portable terminal of the invention comprises;

a timer for outputting a time-out signal when a predetermined time has passed after the timer is enabled, a clear register for disabling the timer when a clear flag is set, an initialization section for generating a power-off signal when the time-out signal is delivered from the timer, said power-off signal resetting the timer, and a control section for enabling the timer when the program installation is started, setting the clear flag in the clear register when the program installation is accomplished normally and turning off a power supply of the portable terminal when the power-off signal is delivered from the initialization section.

Thus, the program installation can be confirmed reliably in the invention, since the clear flag is set only at the beginning of the application programs after the program installation is accomplished normally.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
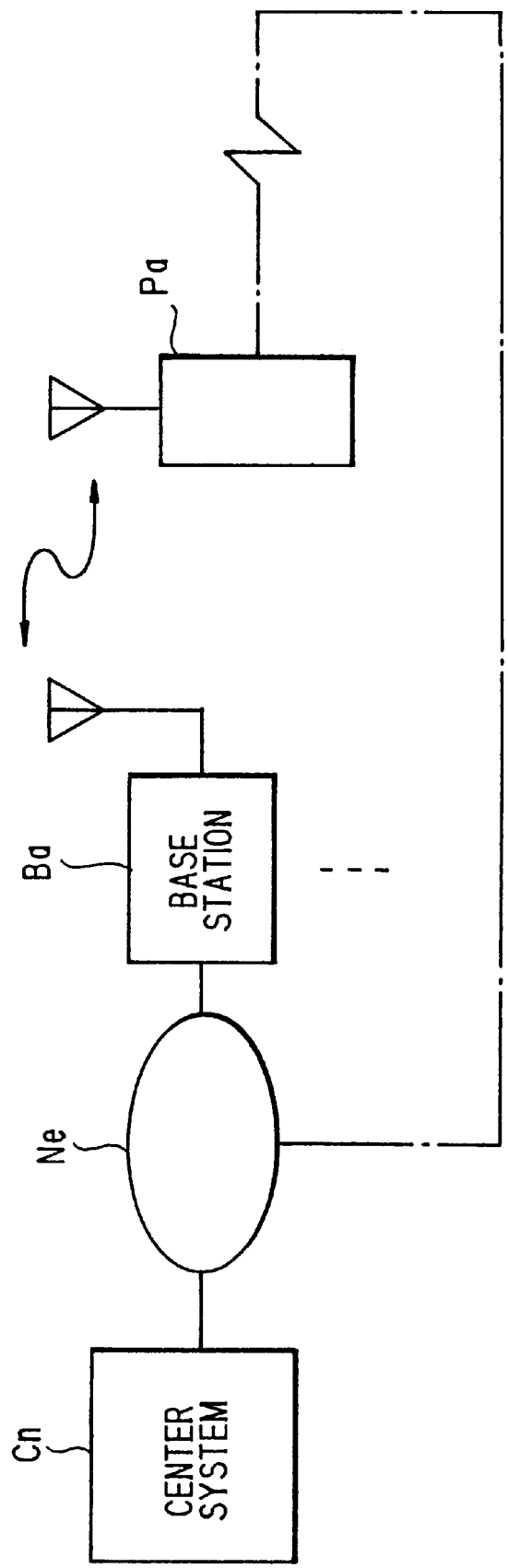
FIG. 1 is a schematic diagram illustrating usage of a portable terminal Pa according to an embodiment of the invention.

FIG. 1 is a schematic diagram illustrating usage of a portable terminal Pa according to an embodiment of the invention. A center system Cn controls a communication network Ne, which may be a cable network or a radio network, and connected to a plurality of base stations Ba by way of the network Ne. The base stations Ba relay data exchange between the center system Cn and the portable terminal Pa connected thereto through the network Ne or another network.

Figure 2:
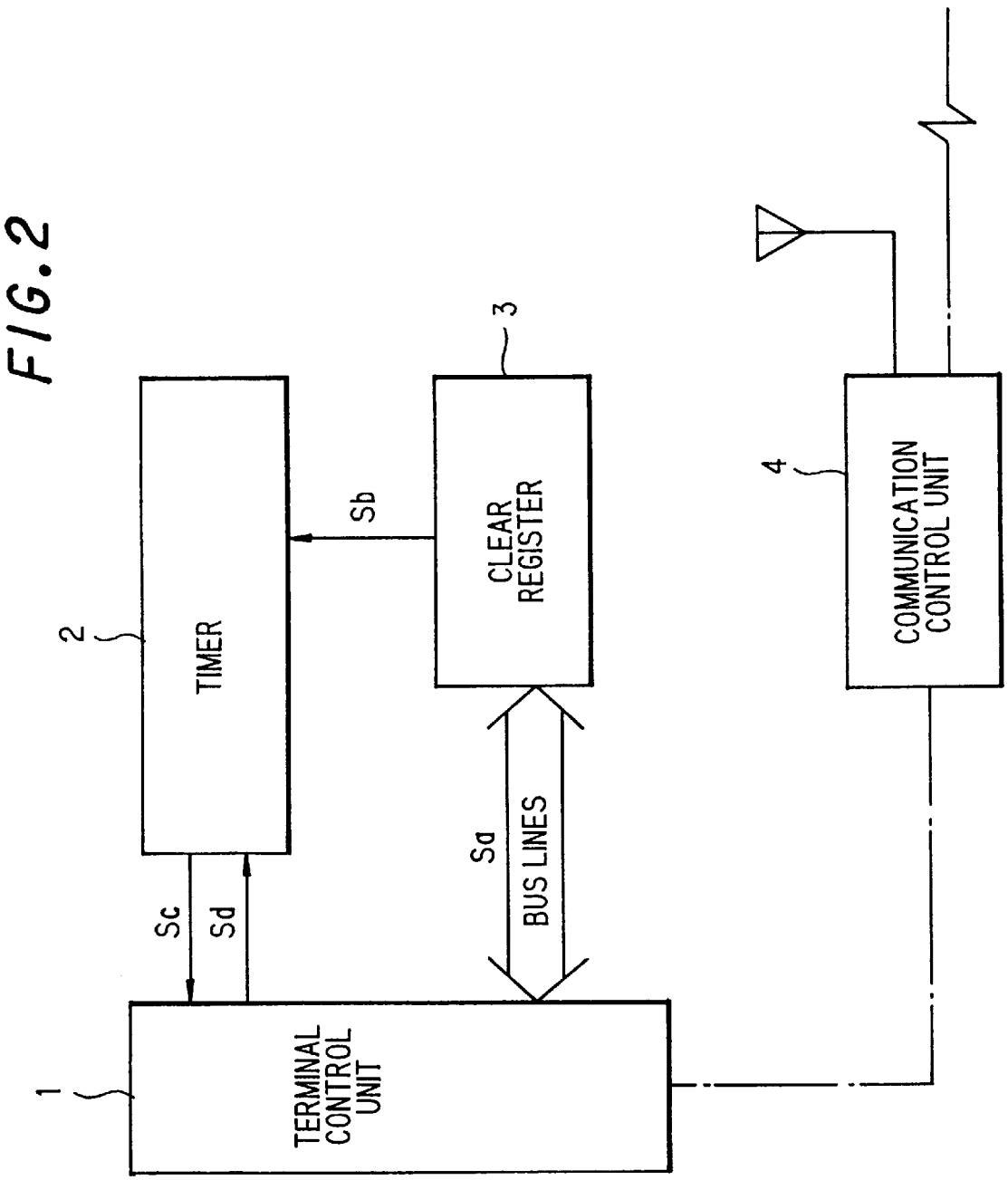
FIG. 2 is a block diagram illustrating a configuration of a part of the portable terminal Pa of FIG. 1.

FIG. 2 is a block diagram illustrating a configuration of a part of the portable terminal Pa of FIG. 1, comprising a terminal control unit 1, a timer 2, a clear register 3 for controlling time count in the timer 2 and a communication unit 4 for controlling data communication through the network.

The terminal control unit 1 takes charge of controlling various operations in the portable terminal Pa, including access to one of the base stations Ba and program installation through the network.

In FIG. 2, the timer 2 and the clear register 3 are illustrated separately from the terminal control unit 1, but they may be included in the terminal control unit 1.

Figure 3:
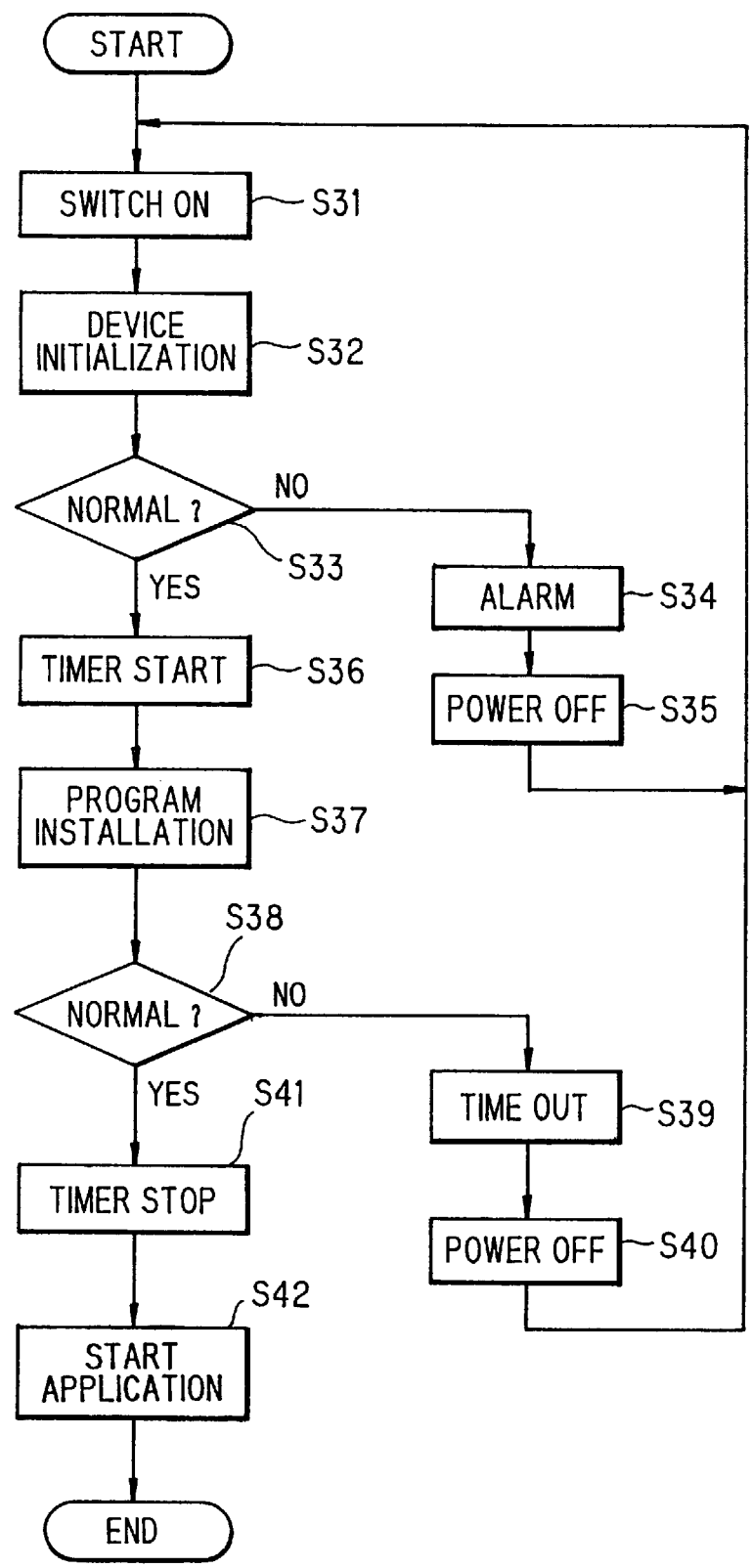
FIG. 3 is a flowchart illustrating operation of the embodiment of FIG. 2.

Now, operation of the embodiment of FIG. 2 is described referring to a flowchart of FIG. 3.

Figure 9:
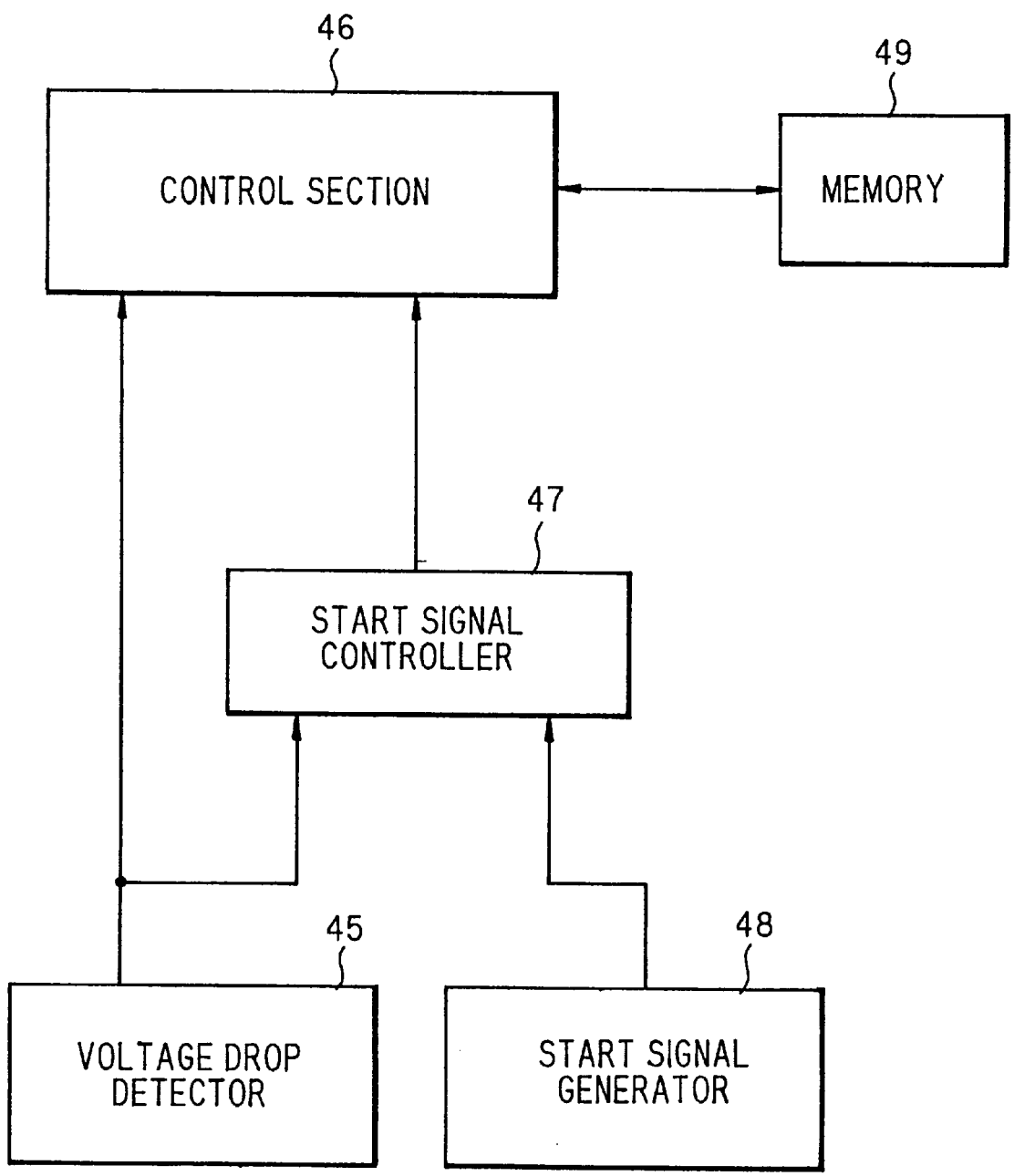
FIG. 9 is a block diagram illustrating a configuration of a portable terminal of another prior art.
Figure 10A:
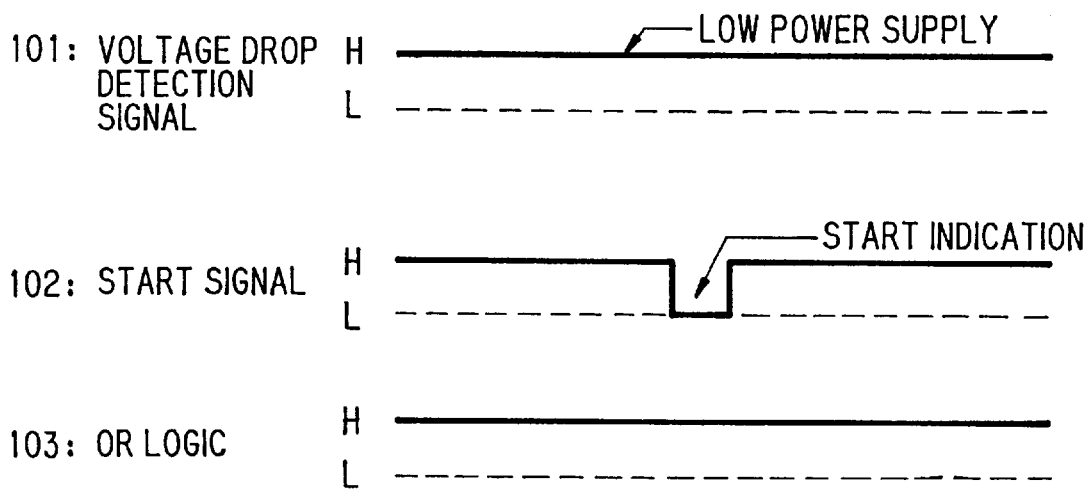
FIG. 10a is a timing chart illustrating operation of the start signal controller 47 of FIG. 9 when the power supply voltage is lower than a certain level.
Figure 10B:
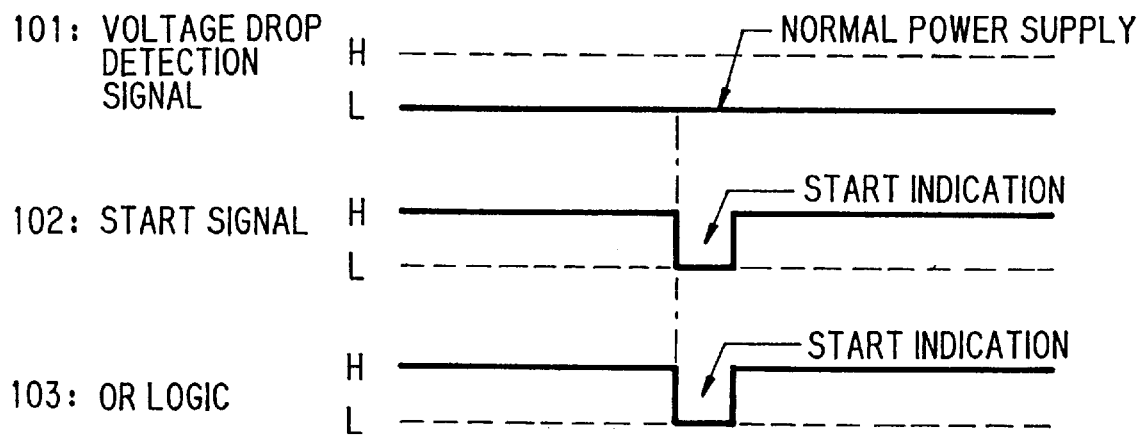
FIG. 10b is another timing chart illustrating the operation of the start signal controller 47 when the power supply voltage is higher than the certain level.

When a power switch of the portable terminal is turned on (at step S31), the terminal control unit 1 initializes devices in the portable terminal Pa (at step S32). When the power supply voltage is found lower than a predetermined voltage in the same way as described in connection with the prior art of FIG. 9 or when any other malfunction of the devices is found (at step S33), the terminal control unit 1 alarms the user (at step S34) and turns off the power supply, (at step S35).

Figure 8:
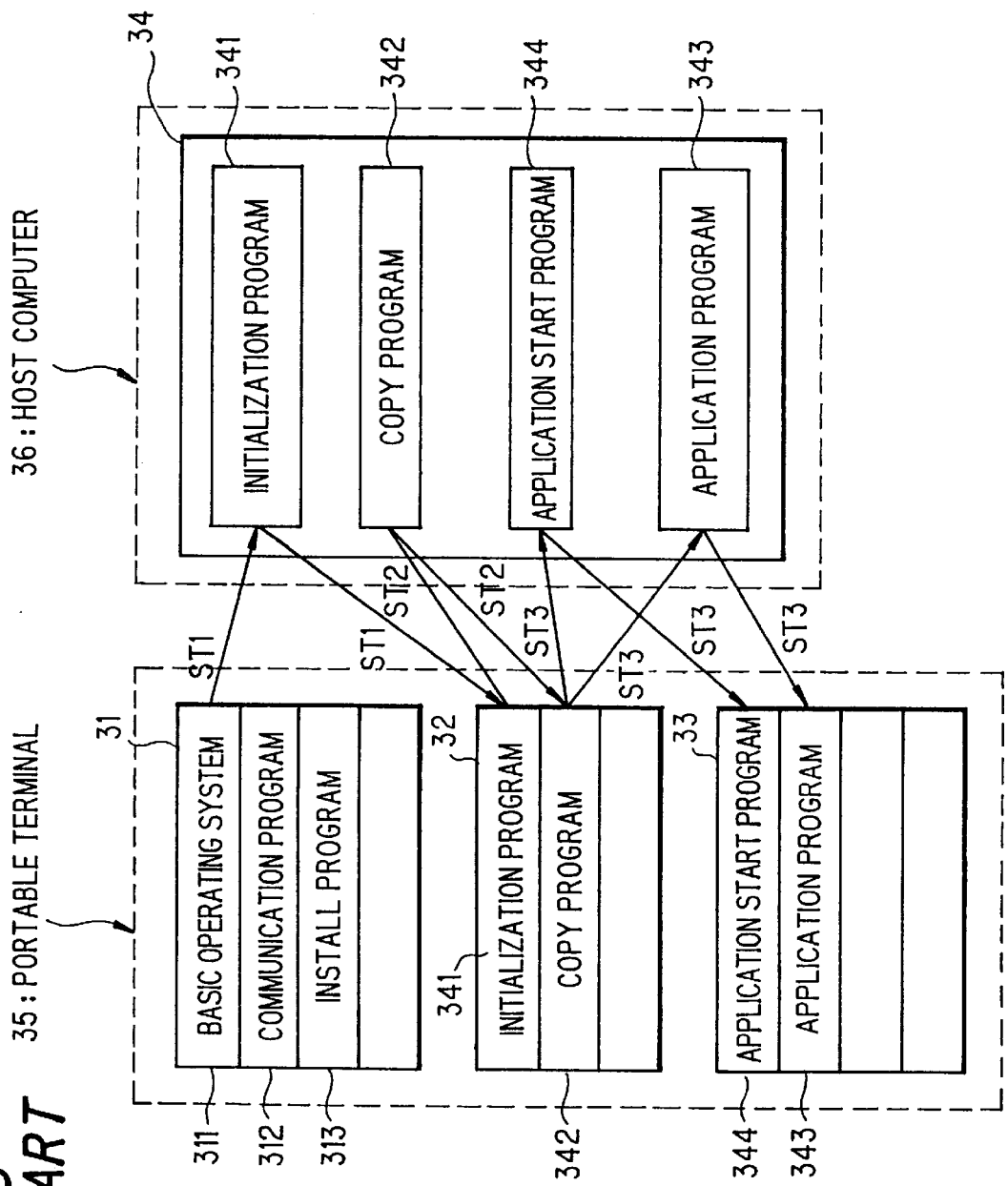
FIG. 8 is a schematic diagram illustrating a program install method of a prior art.

When the power supply voltage is confirmed to be higher than the predetermined voltage and the device initialization is performed normally, the terminal control unit 1 delivers a power-on signal Sd to the timer 2, which starts the timer 2 (at step S36) to count up clock pulses, for example. Then the terminal control unit 1 starts the program installation (at step S37) in a similar way as described in connection with the prior art of FIG. 8, for example.

When the program installation is found to be accomplished normally (at step S38), the terminal control unit 1 delivers an installation accomplishment signal Sa to the clear register 3 for setting a clear flag ON. When the clear flag becomes ON, a timer stop signal Sb is sent to the timer 2 to cause the timer 2 to stop counting the clock pulses (at step S41). Then, application programs begin to run (at step S42).

In case the program installation is not accomplished normally, because of a fall of the power supply voltage or because of a communication error in the program installation, for example, such as beforehand described, the installation accomplishment signal Sa is not delivered and the timer 2 continues to count up the clock pulses. When the count number of the timer 2 arrives at a predetermined number, the timer 2 delivers a time-out signal Sc to the terminal control unit 1 (at step S39), with which the terminal control unit 1 turns off the power supply (at step S40).

Thus, the program installation can be confirmed reliably in the embodiment, since the clear flag is set ON at the beginning of the application programs after the program installation is accomplished normally.

Figure 4:
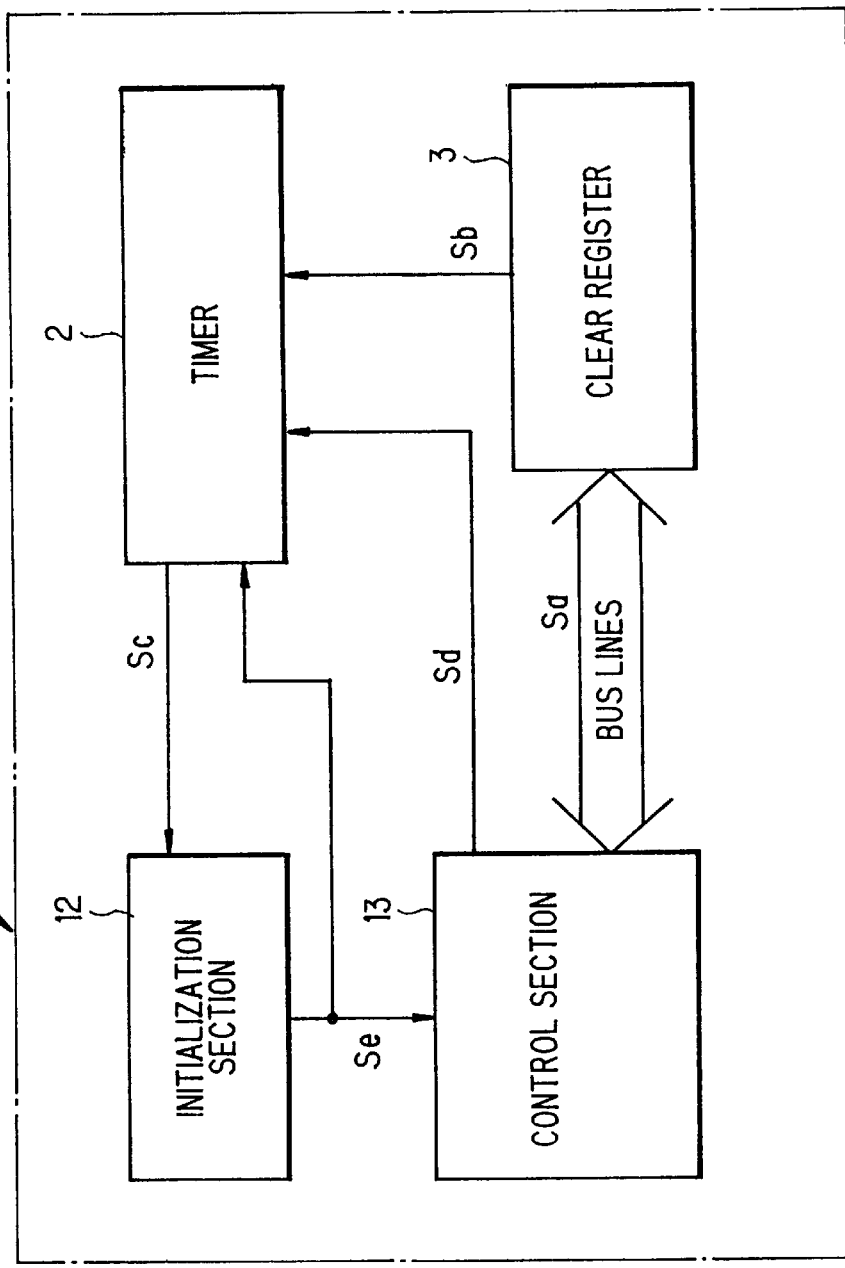
FIG. 4 is a block diagram illustrating another embodiment of the invention.

FIG. 4 is a block diagram illustrating another embodiment of the invention, wherein the timer 2 and the clear register 3 of FIG. 2 are included in the terminal control unit 1 which is implemented in a CPU (Central Processor Unit) or a DSP (Digital Signal Processor), together with an initialization section 12 and a control section 13.

The control section 13 sends the power-on signal Sd after the device initialization in the same way as described referring to steps S31 to S36 of FIG. 3. When the program installation is accomplished normally, the clear flag is set ON by the installation accomplishment signal Sa generated by the control section 13 to stop the timer 2 and the application programs start to run in the same way with the embodiment of FIG. 2.

When the program installation is not accomplished normally, the clear flag is left OFF and the timer 2 outputs the time-out signal Sc to the initialization section 12 when the count number arrives at the predetermined number. Receiving the time-out signal Sc, the initialization section 12 outputs a power-off signal Se to the control section 13 and the timer 2. Receiving the power-off signal Se, the timer 2 is initialized and the control section 13 turns off the power supply.

Thus, the program installation is confirmed reliably in the embodiment of FIG. 4 as well as in the embodiment of FIG. 2.

Figure 5:
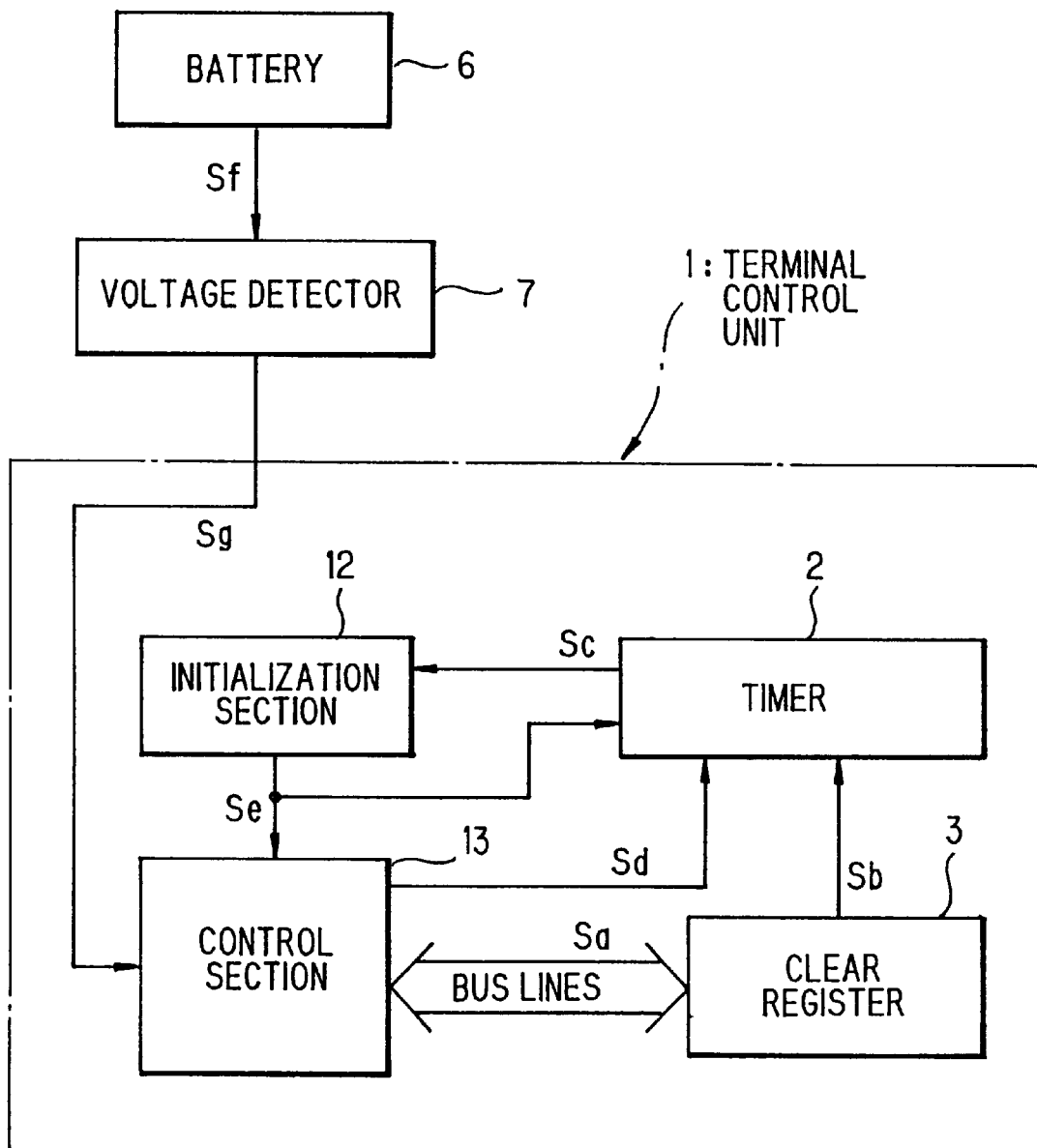
FIG. 5 is a block diagram illustrating a still another embodiment of the invention.

FIG. 5 is a block diagram illustrating a still another embodiment of the invention, wherein a voltage detector 7 is further provided in addition to the embodiment of FIG. 4.

The voltage detector 7 outputs a voltage drop detection signal Sg when it detects a fall of a power supply voltage Sf of a battery 6.

In the embodiment of FIG. 5, whenever the control section 13 receives the voltage drop detection signal Sg, in the device initialization process (at step S32 of FIG. 3), in the program installation process (at step S37), or after the application programs are started to run (at step S42), it alarms the user and turns off the power supply in the same way as described in connection with steps S33 to S35 of FIG. 3.

Thus, in the embodiment of FIG. 5, the power supply is turned off reliably when the power supply voltage drops even after the application programs are started to run.

Now, the configuration of the timer 2 of the embodiments of FIGS. 2, 4 and 5 is described.

The timer 2 also may malfunction because of a fall of the power supply voltage. So, the malfunction of the timer 2 itself should be detected reliably.

Figure 6:
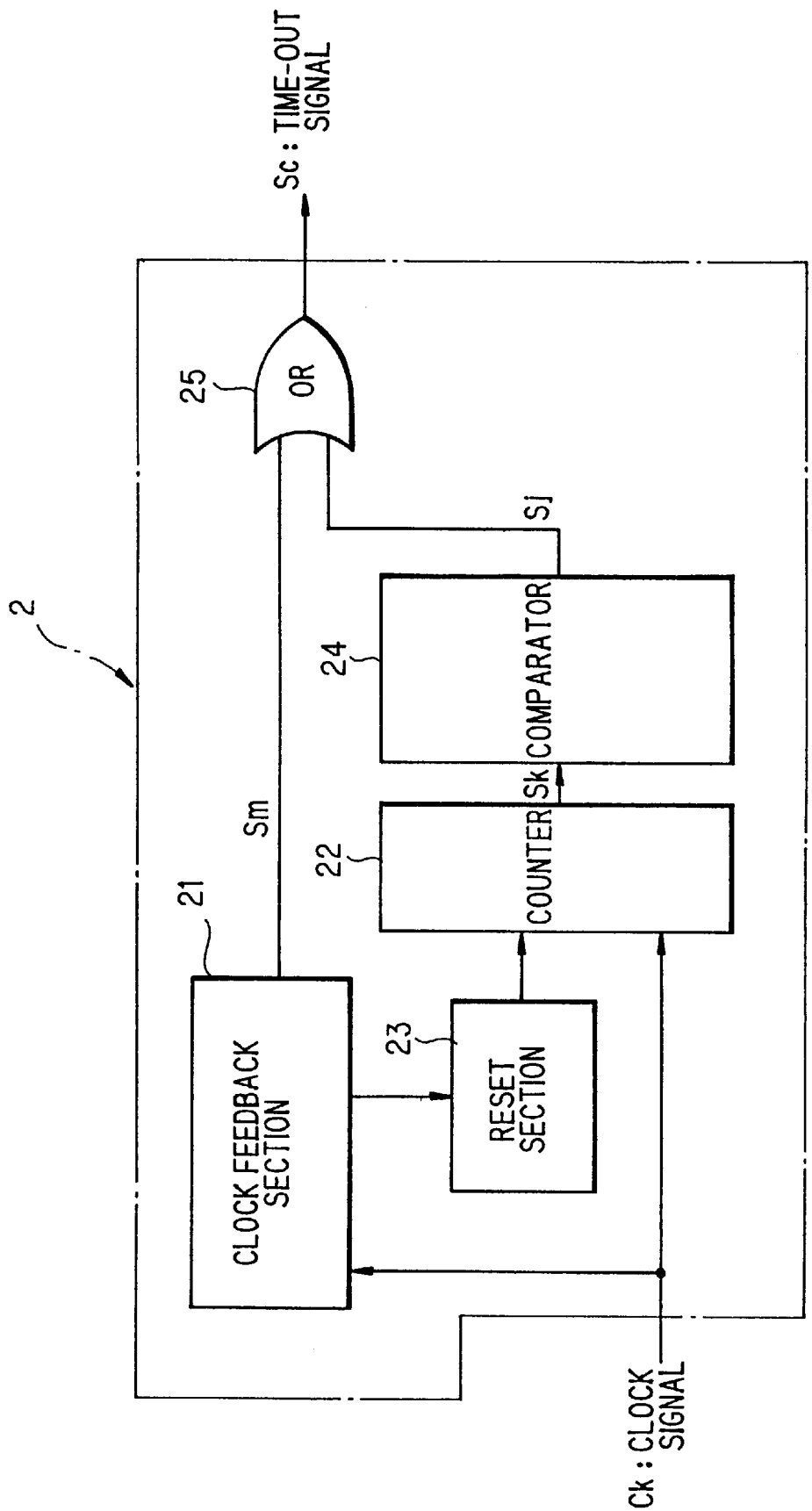
FIG. 6 is a block diagram illustrating the configuration of the timer 2 of the embodiments of FIGS. 2, 4 and 5.

FIG. 6 is a block diagram illustrating the configuration of the timer 2, which comprises:

a clock feedback section 21 for checking stability of a clock signal CK and outputting an instability signal Sm when the clock signal CK is found unstable, a counter 22 for counting a pulse number Sk of the clock signal CK, a reset section 23 for resetting the counter 22, when the clock signal CK is found unstable, as controlled by the clock feedback section 21, a comparator 24 for comparing the pulse number Sk counted by the counter 22 with a predetermined number and outputting a time pass signal Sj when the pulse number Sk arrives at the predetermined number, and an OR gate 25 for outputting OR logic of the instability signal Sm and the time pass signal Sj as the time-out signal Sc.

Figure 7:
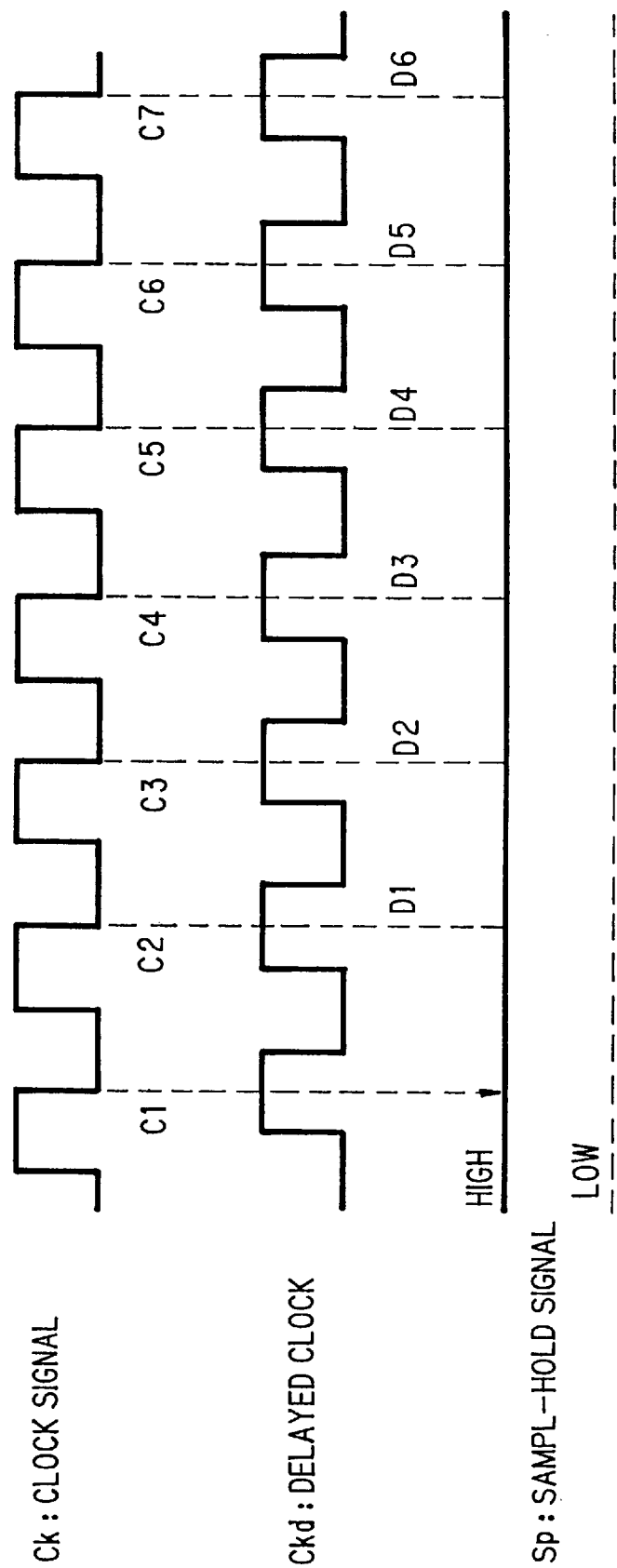
FIG. 7 is a timing chart illustrating operation of the clock feedback section 21 of FIG. 6.

FIG. 7 is a timing chart illustrating operation of the clock feedback section 21 of FIG. 6.

Referring to FIG. 7, a delayed clock Cl(d, having pulses D1, D2, . . . is obtained by delaying the clock signal CK, having respective pulses C1, C2, . . . , (for 1.25 cycle in the example of FIG. 7). The delayed clock CKd is sampled and held at every falling edge of the clock signal CK. So, when the wave form of the clock signal CK is sufficiently sharp without noise, a sample-hold signal Sp at HIGH level is output stably.

When there are noises in the clock signal CK, the sample-hold signal Sp turns to LOW level, which controls the reset section 23 to stop the counter 22. At the same time, the instability signal Sm, having inverted logic of the sample-hold signal Sp, is output to the OR gate 25.

Thus, the time-out signal Sc is also output and the control section 13 turns off the power supply when the timer 2 is not able to count up the clock pulses normally.

In the example of FIG. 6, there is provided one set of the clock feedback section 21. However, there may be provided a plurality of clock feedback sections for detecting noises in the clock signal CK more reliably, each sampling each of delayed clocks having different phase differences, 1.1 cycle, 1.2 cycle, . . . , 1.9 cycle, for example, to the clock signal CK.

What is claimed is:

1. A portable terminal comprising:
    a timer for outputting a time-out signal when a predetermined time has passed after the timer is enabled; and
    a controller for enabling the timer when a program installation process is started in the portable terminal, for disabling the timer when the program installation process is completed normally, and for turning off a power supply of the portable terminal when the controller receives the time-out signal.

2. A portable terminal recited in claim 1, said controller comprising:
    a clear register for disabling the timer when a clear flag is set;
    an initialization section for generating a power-off signal when the time-out signal is delivered from the timer, said power-off signal resetting the timer; and
    a control section for enabling the timer when the program installation is started, for setting the clear flag in the clear register when the program installation is accomplished normally and for turning off the power supply when the power-off signal is delivered from the initialization section.

3. A portable terminal recited in claim 1, further comprising a voltage detector for controlling the controller to turn off the power supply when a voltage of the power supply is detected to be lower than a predetermined value.

4. A portable terminal recited in claim 1, said timer comprising:
    a clock feedback section 21 for obtaining a sample-hold signal by sampling and holding a delayed clock signal which is obtained by delaying a clock signal for a certain period starting at every falling edge of the clock signal, and for outputting an instability signal when the sample-hold signal turns to a LOW level;
    a counter for counting a pulse number of the clock signal,
    a reset section for resetting the counter, when the sample-hold signal turns to the LOW level;
    a comparator for outputting a time pass signal when the pulse number counted by the counter arrives at predetermined number;
    an OR gate for outputting OR logic of the instability signal and the time pass signal as the time-out signal.

5. A portable terminal recited in claim 1, wherein said program installation is performed turning data delivered through a communication network.

* * * * *